United States Patent
Gido et al.

(10) Patent No.: US 11,021,854 B2
(45) Date of Patent: Jun. 1, 2021

(54) LIQUID DESICCANT VAPOR SEPARATION SYSTEM

(71) Applicant: TECHNION RESEARCH AND DEVELOPMENT FOUNDATION LIMITED, Haifa (IL)

(72) Inventors: Ben Gido, Upper Galilee (IL); David Broday, Nofit (IL); Eran Friedler, Kibbutz Dalia (IL)

(73) Assignee: TECHNION RESEARCH AND DEVELOPMENT FOUNDATION LIMITED, Haifa (IL)

( * ) Notice: Subject to any disclaimer, the term of this patent is extended or adjusted under 35 U.S.C. 154(b) by 96 days.

(21) Appl. No.: 16/313,173

(22) PCT Filed: Jun. 26, 2017

(86) PCT No.: PCT/IL2017/050708
§ 371 (c)(1),
(2) Date: Dec. 26, 2018

(87) PCT Pub. No.: WO2018/002918
PCT Pub. Date: Jan. 4, 2018

(65) Prior Publication Data
US 2019/0153704 A1    May 23, 2019

(30) Foreign Application Priority Data
Jun. 26, 2016   (IL) .......................................... 246467

(51) Int. Cl.
*E03B 3/28*        (2006.01)
*B01D 53/26*       (2006.01)

(52) U.S. Cl.
CPC ............... *E03B 3/28* (2013.01); *B01D 53/26* (2013.01); *B01D 53/263* (2013.01); *B01D 53/265* (2013.01); *Y02A 20/00* (2018.01)

(58) Field of Classification Search
CPC ...... B01D 53/14; B01D 53/28; B01D 5/0075; B01D 53/263; B01D 53/18; E03B 3/28
See application file for complete search history.

(56) References Cited

U.S. PATENT DOCUMENTS 3,777,456 A   12/1973  Lund
5,106,512 A    4/1992  Reidy
(Continued)

FOREIGN PATENT DOCUMENTS

AU      2014304532 A1    3/2016
WO     2013/182911 A1   12/2013

OTHER PUBLICATIONS

International Search Report for PCT/IL2017/050708, dated Oct. 26, 2017, 4 pages.
(Continued)

*Primary Examiner* — Elizabeth J Martin
(74) *Attorney, Agent, or Firm* — Roach, Brown, McCarthy & Gruber, P.C.; Kevin D. McCarthy

(57) ABSTRACT

An atmospheric moisture harvesting system, in which water vapor is separated from the air using a liquid desiccant subsystem. The moisture charged liquid desiccant enters a desorber and condensation system, where the moisture is extracted. Cooling and condensation are performed on the extracted water vapor only, thereby saving the energy for cooling air containing the water vapor, as is done in direct cooling systems. The system thus operates as a single stage vapor separation system since the vapor concentration remains in the liquid desiccant which is circulated to the separation and condensation subsystems without air laden with the moisture. Low grade or solar heat can be used as the energy source for the vapor desorption. A heat exchanger utilizes unwanted heat from regenerated desiccant to heat up charged desiccant entering the regenerating stage. The sys-
(Continued)

tem has substantial energy savings over prior art systems using direct cooling of air.

7 Claims, 1 Drawing Sheet

(56) References Cited

U.S. PATENT DOCUMENTS

| | | |
|---|---|---|
| 6,156,102 A | 12/2000 | Conard et al. |
| 2006/0130654 A1* | 6/2006 | King .......................... C02F 1/16 |
| | | 95/231 |
| 2006/0191411 A1 | 8/2006 | Johnson |
| 2018/0169571 A1* | 6/2018 | Stuckenberg ............. B01F 3/04 |

OTHER PUBLICATIONS

Written Opinion of the International Searching Authority for PCT/IL2017/050708, dated Oct. 29, 2017, 6 pages.

Gido et al., "Liquid-Desiccant Vapor Separation Reduces the Energy Requirements of Atmospheric Moisture Harvesting" (Jul. 20, 2016) Environ. Sci. Technol., vol. 50, (6 pages).

\* cited by examiner

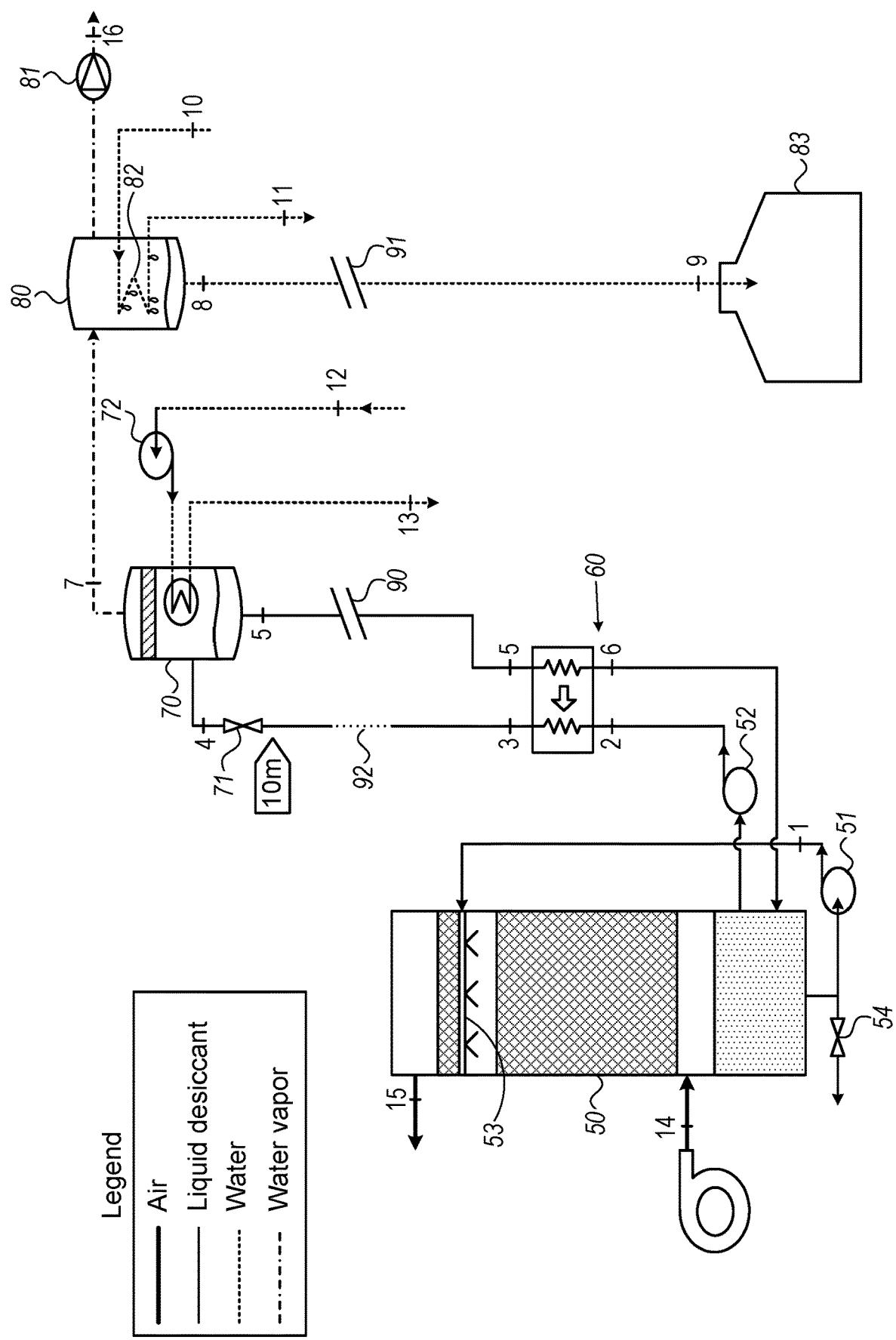

LIQUID DESICCANT VAPOR SEPARATION SYSTEM

FIELD OF THE INVENTION

The present invention relates to the field of moisture harvesting from the atmosphere, especially using a liquid desiccant vapor separation plant.

BACKGROUND

The ever growing world population and the increasing demand for freshwater is overstretching the natural water resources in many arid and semi-arid regions around the globe. As existing potable water resources are being depleted, alternative water sources and innovative technologies for drinking water production are sought. Desalination of seawater by reverse osmosis (RO) has become cost-effective in the last decade and is among the most promising technologies for intensive freshwater production. However, it requires a large saline water source and therefore is not applicable in countries or regions that do not have access to the sea or to saline underground water reservoirs. Moreover, desalination requires large capital investments for building the desalination plant. Supplying water to non-coastal and inner regions requires additional significant capital investment in piping and pumping infrastructure and in its operation and maintenance—an investment that may be cost prohibitive, especially when the water should be delivered to scattered populations.

Atmospheric water vapor is another potential source of freshwater, which sums up to a significant amount and is accessible essentially everywhere. The atmosphere contains about 13,000 km$^3$ of freshwater, 98% of which are vapor and only 2% are in a condensed phase (clouds, fog). In fact, this amount is comparable to all the surface and underground freshwater (excluding ice and glaciers). Fog can be simply collected from the air merely by impaction and interception of the fog droplets on collection surfaces. Indeed, fog harvesting has been practiced and studied considerably over the last few decades. Recent studies are focused on optimizing the surface properties of fiber network structures for increasing the harvesting potential. However, the limiting factor remains the necessary meteorological conditions for fog occurrence. Several environmental processes can cause the temperature of moist air to drop below its dew point temperature to form fog. Yet, frequent occurrence of these processes characterizes only very specific places that enjoy favorable conditions. Thus, on a global scale, fog is even less accessible than seawater as an alternative source of freshwater.

Water vapor is prevalent in the atmosphere but its harvesting is more thermodynamically complicated than fog harvesting because the vapor must be condensed to liquid—a process that involves significant release of heat (2500 kJ/kg$_w$). Condensation occurs when moist air is cooled to a temperature below its dew point, normally in close proximity to cold surfaces whose properties affect the formation of liquid droplets. The surface temperature has to remain below the ambient dew point temperature for condensation to continue despite the release of the latent heat of condensation and its sensible heat interaction with both the condensing and the non-condensable components of the ambient air. Naturally, dew is formed when the surface temperature is maintained below the dew point temperature as a result of radiative cooling of the surface towards the night sky, which acts as a heat sink. As such, dew formation is limited by the surface radiation properties, and is highly affected by the ambient conditions. Whereas passive dew collection was argued to yield 0.8 mm H$_2$O/night, empirical data suggest lower yields. Still, in coastal areas with high relative humidity passive dew collection may be a supplementary water source. However, when the dew point temperature is significantly lower than the ambient temperature a very significant sensible heat interaction between the air and the surface takes place. This sensible heat interaction poses further demands on the surface radiative cooling and may prevent it from reaching or maintaining the dew point temperature, thus diminishing dew condensation.

Alternatively, active atmospheric moisture harvesting (AMH) can be obtained by an electrical refrigeration system. Namely, the heat (latent and sensible) involved in the process is removed by a standard compression-expansion refrigeration cycle. Such a direct cooling system can be seen in U.S. Pat. No. 5,106,512 to J. J. Reidy, for "Potable Air-Water Generator".

Previous work indicated that in comparison to RO desalination, the energy requirement of an electrical air cooling system is about two orders of magnitude higher, and that the sensible heat interaction of the air, which does not contribute to water production, consumes 40-90% of the energy, depending on the ambient conditions. Significant reduction of the energy requirements may be achieved if the vapor is separated from the bulk air before the cooling, such that only the vapor is cooled rather than the entire air bulk. A selective membrane technology has been suggested for this purpose, with the performance of the whole membrane-assisted humidity harvesting system evaluated numerically for limited ambient conditions and showing energy saving of up to 50%. However, the very large membrane area requirement requires the development of high-performance membrane modules (and of hermetically sealed low-power fans) which are not yet commercially available. Hence, implementation of this technology is not currently feasible.

Another approach for separating water vapor from the air is by using a desiccant. In U.S. Pat. No. 3,777,456 for "Extracting Water from the Atmosphere" to B. G. A. Lund, there is described a system for extracting water from the atmosphere by circulating a large volume of a solution of lithium chloride in water continuously over a Munters packing in a tower of conventional cooling tower design. Excess solution formed as a result of the absorption of water is bled off and passed through a desalination plant where product water is produced. The desalination plant as illustrated in that patent is one in which water is recovered from the solution by flash distillation. Since the system described in the Lund system uses passive air flow, it would be problematic for scaling down the system for use on a small scale such as for individual building use, with rooftop placement.

In the PCT application published as International Publication No. WO 2013/182911 for "Water Recovery System and Method" by James Ball et al, there is described a system and method for recovering water from an ambient air stream. Dehumidification of the airstream is achieved by removal of the water. The device includes a chamber having trays that hold liquid desiccant. Air is circulated through the device to remove water vapor and an extraction cycle removes water collected in the liquid desiccant by a condenser communicating with the chamber. An integral heat exchanger adds heat to the chamber during the extraction cycle. This system operates on a non-continuous batch process. As stated in the Summary of the Invention section of that application, "Operation of the device includes two cycles. The first cycle is a charge cycle in which ambient air is passed through the chamber, across the desiccant stack, and back to the environment. The desiccant causes water vapor in the airstream to be taken up and held in a foam media material that holds the desiccant. Once the desiccant media has absorbed a sufficient amount of water from the airstream, an extraction cycle is initiated to recover water from the desiccant solution. In this cycle, the chamber is isolated from the ambient air, and energy is added to the chamber in order to vaporize the water from the desiccant solution." Besides the non-continuous generation process, this system appears to have the disadvantage that since the moisture laden hot air obtained from the moisture saturated liquid desiccant has to be cooled in order to give up its moisture content, and this involves expenditure of energy in cooling down the air (sensible heat energy) in addition to the that generated in condensing the moisture from the air, the system seems to have the same disadvantages as prior art direct cooling water generators.

In US Patent Application published as US 2006/0130654, to R. King et al, for "Method and Apparatus for Recovering Water from Atmospheric Air", there is described a method of separating water from air comprising the steps of (a) contacting air having water vapour with an hygroscopic liquid mixture to produce a water rich hygroscopic liquid mixture, (b) heating at least a portion of the water rich hygroscopic liquid mixture to produce a gaseous mixture including water vapour and at least one other gaseous component, (c) condensing at least a portion of the water vapour in the gaseous mixture to produce liquid water and a depleted gaseous mixture at a first pressure, and (d) removing at least a portion of the at least one other gaseous component to maintain the first pressure below a predetermined pressure, wherein the depleted gaseous mixture is in fluid communication with the water rich hygroscopic liquid mixture. An absorber vessel is also provided for effecting the method of separating water from air.

However, the system described in US 2006/0130654 has a number of disadvantages in that it appears to be a complex industrial system, possibly for high volume use, and includes a number of features, some of which will be considered in the disclosure below, which may render it costlier to manufacture and operate than could be achieved in systems developed for low cost installation, maintenance and operation.

There therefore exists a need for a liquid desiccant vapor separation plant for harvesting moisture from the atmosphere, which overcomes at least some of the disadvantages of prior art systems and methods, especially with regard to complexity and capital cost, and maintenance and running expenses or overall energy efficiency, so that it can be effectively used for small communities.

The disclosures of each of the publications mentioned in this section and in other sections of the specification, are hereby incorporated by reference, each in its entirety.

SUMMARY

The present disclosure describes new exemplary systems for continuous liquid-desiccant vapor separation. The system saves the energy that would have been required for cooling the bulk air by performing the step of extracting the moisture from the atmospheric air by absorption using a flowing liquid desiccant system, and then extracting that moisture by means of a separate cooling and condensing stages, performed on the moisture laden liquid desiccant only. This has a number of advantages over prior art systems. Firstly the process described is a continuous flow process, with the liquid desiccant flowing continuously through the absorber and a part of it continuously being diverted through a desorber, such that a closed-circuit continuous flow of liquid desiccant is used to transfer the moisture from the atmosphere to the desorber, after which moisture is regained in a condenser. An energetic advantage of this system is that the final condensation of the moisture is performed without the need to cool down a volume of air incorporating that moisture, such that the only energy expenditure is that of disposing of the latent heat of the vapor, and there is no need for any sensible heat expenditure in order to cool down moisture-laden air.

Thus the energy disadvantage of atmospheric moisture harvesting (hereinafter AMH) by direct cooling is avoided in the present disclosure. AMH involves contact of ambient air with a cold surface, where the temperature difference facilitates heat transfer from the air to the surface and results in cooling of the air near the surface. The humidity that exceeds the vapor saturation capacity of the air condenses on the surface. The total heat interaction of the air is the sum of the sensible heat interaction, which is associated with the temperature change of the air and the vapor, and the latent heat release, which is associated with the enthalpy of condensation, $$q_{tot}=q_s+q_l, \qquad (1)$$

where $q_{tot}$ [kJ/kg$_a$] is the total heat interaction,
$q_s$ [kJ/kg$_a$] is the sensible heat interaction and
$q_l$ [kJ/kg$_a$] is the latent heat of condensation.

For practical reasons, all the interactions are defined per one kg of dry air (denoted by kg$_a$). The ratio of the latent-to-total heat interactions is a useful parameter for measuring the efficiency of such systems, and is designated the Moisture Harvesting Index (MHI). The MHI is a key parameter for assessing the overall energy requirements of an AMH process by direct cooling. In areas most suitable for AMH, e.g. tropical regions, about half of the total heat interaction is wasted on sensible heat removal, whereas in dryer regions the sensible heat interaction may amount to about 90% of the total heat interaction due to the low ambient vapor content. In the present disclosed system, separating the vapor from the bulk air prior to cooling is used to significantly reduce the energy demands of the AMH system.

The liquid-desiccant vapor separation (LDS) system disclosed in this application operates continuously in a closed-cycle, and its regeneration requires low-grade or solar heat. The product of this sub-system is pure water vapor, which is then condensed by a standard cooling system without the burden of cooling the bulk air. This results in substantive energy savings for the overall system.

The process of the present system is a single stage vapor separation system, since the vapor concentration remains in the liquid desiccant which is circulated directly to a flash drum where the vapor is again separated, ready for condensation back to water. Furthermore, only a portion of the circulating liquid desiccant is taken in the heating/cooling desorbing cycle, and this is done in an energetically advantageous manner by using the heat extracted from the freshly desorbed desiccant in order to heat up the desiccant for the desorbing process, thereby again increasing the energy efficiency of the system.

There is thus provided in accordance with an exemplary implementation of the devices described in this disclosure, a system for extracting water from the atmosphere, comprising:

(i) a vapor absorber vessel having atmospheric air inlet and outlet ports, at least one liquid desiccant inlet port, at least two liquid desiccant outlet ports, and a surface on which the liquid desiccant flows between the at least one liquid desiccant inlet port and the at least two liquid desiccant outlet ports, the liquid desiccant having a concentration such that it is below its supersaturation level, (ii) an absorption cycle pump adapted to circulate a first portion of the liquid desiccant from a first of the outlet ports to at least one inlet port, (iii) a flash drum vapor desorber adapted to receive a second portion of the liquid desiccant from a second outlet port, after passage through an expansion valve, the flash drum vapor desorber incorporating an element for supplying heat to liquid desiccant therein, (iv) a vapor condenser receiving desorbed vapor from the flash drum vapor desorber, the condenser incorporating a cooling element cooled to a temperature of less than 20° C., for enabling the condensing of the desorbed vapor to water, (v) an output conduit for collecting water condensed in the vapor condenser, and (vi) a heat exchanger located such that it receives desorbed heated liquid desiccant from the flash drum vapor desorber and transfers part of its sensible heat to vapor-charged liquid desiccant passing from the vapor absorber vessel to the flash drum vapor desorber.

In such a system, the at least one liquid desiccant outlet port may be two ports, one connected to the absorption cycle pump, and one connected to the flash drum desorber. Such a system may further comprise a vacuum pump connected to the vapor condenser, to maintain a sub-atmospheric pressure therein. Additionally, such a system may further comprise at least one of a first barometric leg connected in the output conduit from the vapor condenser, and a second barometric leg connected in a path between the flash drum vapor desorber and at least one liquid desiccant outlet port of the vapor absorber vessel.

Additionally, further exemplary implementations of the systems of this disclosure may further comprise at least one of a first pump connected in the output conduit from the vapor condenser, and a second pump connected in a path between the flash drum vapor desorber and at least one liquid desiccant outlet port of the vapor absorber vessel. Furthermore, in such systems, the heat supplied to the liquid desiccant in the flash drum vapor desorber may be a low grade or a solar heat source. Conversely, the cooling element, cooled to a temperature of less than 20° C. for enabling the condensing of the desorbed vapor to water, may be powered by a refrigeration device.

There is further provided, in accordance with yet another exemplary implementation described in this disclosure, a method of extracting water from atmospheric air, comprising the steps of:

(i) passing the air in an absorber tower over a surface containing a liquid desiccant having a concentration such that it is below its supersaturation level, the major part of the liquid desiccant being circulated across the surface, (ii) extracting a part of the circulating liquid desiccant from the absorber tower, and passing it through an expansion valve to a flash drum vapor desorber at a sub-atmospheric pressure, (iii) heating the liquid desiccant in the flash drum vapor desorber to desorb water vapor from the liquid desiccant, (iv) passing the water vapor emitted in the flash drum vapor desorber to a vapor condenser, (v) cooling an element of the vapor condenser to a temperature of less than 20° C. to condense the water vapor into water, and (vi) collecting the water in a storage vessel, wherein desorbed hot liquid desiccant from the flash drum vapor desorber is returned to the absorber tower through a heat exchanger such that it transfers part of its sensible heat content to the liquid desiccant passing from the absorber tower to the flash drum vapor desorber.

In such a method, the water may be collected in the storage vessel from the vapor condenser through a barometric leg or by use of a pump. Additionally, the desorbed hot liquid desiccant from the flash drum vapor desorber may be returned to the absorber tower through a barometric leg or through a pump. Furthermore, the sub-atmospheric pressure in the flash drum vapor desorber may be maintained by use of a vacuum pump. In the latter case, the vacuum pump may be connected to the flash drum vapor desorber through the vapor condenser.

Yet further methods of extracting water from atmospheric air, may comprise the steps of:

(i) charging liquid desiccant having a concentration below supersaturation, with water vapor from the atmospheric air in contact with the liquid desiccant flowing along a surface in an absorber vessel, (ii) desorbing the water vapor by heating the charged liquid desiccant in a flash drum desorbing vessel at a sub-atmospheric pressure, (iii) cooling the water vapor to a temperature below 20° C. such that water is condensed therefrom, and (iv) returning the heated desorbed liquid desiccant to the absorber vessel through a heat exchanger, in which at least part of its heat content is transferred to the charged liquid desiccant passing from the absorber vessel to the flash drum desorbing vessel.

In such a method, the desorbing of the water vapor may be performed on a part of the liquid desiccant charged with water vapor, such that the other part of the liquid desiccant can be further charged with water vapor in the absorber vessel.

BRIEF DESCRIPTION OF THE DRAWINGS

The present invention will be understood and appreciated more fully from the following detailed description, taken in conjunction with the drawing in which:

FIG. 1 is a schematic drawing of an exemplary implementation of a complete system according to the present disclosure.

DETAILED DESCRIPTION

Reference is now made to FIG. 1, which illustrates schematically a view of an exemplary implementation of a complete system described in the present disclosure. The system comprises six major component subsystems:

(a) a vapor absorber (air dehumidifier) 50, (b) a liquid-liquid heat exchanger 60, (c) a flash-drum vapor desorber and liquid desiccant solution regenerator 70, (d) a condenser 80, and (e) two barometric legs 90, 91.

In FIG. 1, the small numbers next to the flow paths indicate the different thermodynamic states of the fluids flowing through the various component subsystems of the complete system. The vapor absorber 50 can have different designs such as a packed-bed tower that is assumed to operate adiabatically, or an internally cooled, air-desiccant heat and mass exchanger, or a curtain-like heat and mass exchanger tower, or any other configuration that provides suitable vapor absorption to the liquid desiccant at the flow rates required. Desiccant solution, which can advantageously be lithium chloride solution because of its chemical stability, though any other desiccant solution, such as calcium chloride, may also be used (state 1), is pumped via an absorption cycle pump 51 to a distributor 53 at the top of the tower 50 and trickles or flows downwards over a high surface area packing material, for the case of a packed-bed absorber. Ambient air from the atmosphere (state 14) enters the absorber tower at its bottom end, and is brought in counter-flow contact with the concentrated desiccant solution, with the mass transfer of ambient water vapor into the absorbing solution being controlled by the vapor pressure gradient. After traversing the height of the tower, part of the liquid desiccant, now having absorbed water vapor, is pumped back up to the top of the tower in order to absorb even more water vapor in an additional traverse down the tower against the counter flowing moist input air. The arrangement of flowing the air upwards towards the distributor ensures that the air which contains the least quantity of moisture, namely that at the end of the flow up the desiccant tower, and therefore requiring the most efficient absorption process by the desiccant, meets the freshest desorbed desiccant having the optimum absorbing power, at a location where it enters the tower at the top end. The use of a configuration having the air contacting a liquid desiccant flowing or trickling over a large area surface, has advantages over a sprayed desiccant absorption chamber, as shown in the prior art, in two aspects: firstly, the spray configuration of the liquid desiccant requires the expenditure of additional energy on the fluid pressure to generate the spray, and secondly, there is an operational disadvantage in using sprays of desiccant, since, as described in the above referenced US Patent Application 2006/0130654, in order to ensure a sufficiently large area of contact with the air, small droplets of the order of 500 microns are desirable, and droplets of such a small size can become entrapped in the atmospheric air flow, and carried out of the absorber vessel, unless some method of containment control, such as droplet drift collection, is implemented.

The process of absorption of the moisture in the desiccant tower results in the generation of heat, but a part of that heat is extracted in the airflow 15 out of the top of the tower into the atmosphere, such that only part of the generated heat remains within the liquid desiccant.

A fraction of the desiccant solution, instead of being recycled through the absorber tower, is extracted by the regeneration cycle pump 52 to be taken for regeneration in the flash drum vapor desorber which acts as the liquid desiccant solution regenerator 70. Initially, this stream of desiccant for regeneration passes through a liquid-liquid heat exchanger (state 2) where it is pre-heated (state 3) by returning hot regenerated solution (state 5), thus utilizing otherwise unwanted heat from the regenerating stage described below.

In prior art systems, such as that described in the above referenced US 2006/0130654, the water rich hygroscopic liquid collects as a pool of mixture in the desorption vessel, with the level of the mixture controlled by a liquid level sensor and a control valve assembly by throttling the rich liquid absorbent flow rate as it flows to the pump assembly for pumping the desiccant into the desorber vessel. The desorber is configured for heating the water rich hygroscopic liquid mixture to produce a gaseous mixture including water (in the form of water vapor) and small amounts of at least one other gaseous component and a regenerated hygroscopic liquid mixture. The water vapor evaporates from this pool at a low pressure.

In contrast to that prior art arrangement, in the presently described system, the hot stream of vapor-laden desiccant solution now flows through an expansion valve 71 (state 4) and enters a flash drum desorber 70, where the lower pressure causes desorption of water from the desiccant solution. Use of a flash drum desorber is more efficient than a static heated pool desorber, since the expansion valve 71 serves as the "barrier" between the high pressure side and the low pressure side of the regenerating system, and results in instantaneous evaporation of water from the desiccant liquid in the flash drum. This action speeds the process, extracts more moisture than static heated pools, and is equivalent to increasing the surface area of the liquid-vapor interface. Nonetheless, vapor is stripped from the desiccant also due to low grade or solar heat, supplied to the desorber by pump 72.

This configuration may result in a more compact design of the system. The desiccant itself does not evaporate in the flash drum, since its vapor pressure is much higher, practically zero at ambient temperatures and only approximately 1 mm Hg at 85° C. On the other hand, the equilibrium vapor pressure above LiCl solution at the "hot stream" temperatures of 50-70° C., ranges between ~10-25 mm Hg, which can readily be handled by a simple vacuum pump.

The conduit conveying the desiccant from the regeneration cycle pump 52 to the expansion valve 71 is indicated in FIG. 1 as a broken path 92, because it is substantially longer than is shown in the drawing, this being needed only when barometric legs 90, 91 are used, as described hereinbelow, as the method of returning the low pressure regenerated desiccant from the flash drum to the atmospheric pressure of the absorber section. Because of the pump 52 and the expansion valve 71, there is no need for pressure compensation in this line, and the height is needed only to accommodate the height necessitated by the barometric legs 90, 91 in the other lines shown. Although a height of 10 m. is marked on FIG. 1, this is the maximum height that would be needed if there were a very high vacuum generated in the flash drum and condenser, but the height, and the consequential length of the barometric legs, would be reduced if the vacuum were less. The low pressure in the flash drum desorber 70 is maintained by the vacuum pump 81, since although the sequential desorption and condensation of the water vapor should not increase the sub-atmospheric pressure in the flash drum, there may be non-condensable gases trapped in the desiccant, such as air components such as oxygen or nitrogen, and these would slowly raise the pressure in the flash drum if not removed periodically by the vacuum pump 81.

In order to increase the solution regeneration efficiency, the flash drum desorber unit 70 also receives heat from a low grade heat source, such as solar heated water, (state 12), input by a hot water pump 72, and circulated through a heat exchanger in the flash drum desorber, such that desorption of water from the desiccant solution is more readily facilitated. A temperature of up to 50 to 70° C. is suitable for assisting in this process, such that solar heated water is suitable for this purpose. The heating raises the temperature of the desiccant and therefore also its vapor pressure, and such that the vapor pressure of the desiccant in the flash drum is higher than the vapor pressure of the water in the vapor condenser such that there is a slow stream of water vapor transferred from the flash drum desorber to the vapor condenser.

The re-concentrated, regenerated hot solution (state 5) returns to the vapor absorber 50 after passing through the liquid-liquid heat exchanger 60, (state 6) such that it enters the vapor absorption cycle to again participate in vapor absorption from the inflowing air stream, but in a cooler state than was present in the flash drum desorber. The liquid-liquid heat exchanger 60 thus plays a double role in that it both heats up the moisture laden liquid desiccant on its way from the absorber tower to the flash drum for regeneration 70, for which a high temperature is advantageous, and at the same time cools down the freshly desorbed liquid desiccant on its way back from regeneration to the absorber tower 50 for resorption, for which a low temperature is advantageous. A drain tap, 54 is provided at the base of the absorption tower, for periodic full or partial replenishment of the liquid desiccant.

In the presently described system, in order to provide low maintenance use, the liquid desiccant solution should be kept at a concentration which is below supersaturation, since a supersaturated solution may result in clogging of pipes and channels, especially if nucleation centers are present, such as in a field system that may lack high cleanliness. This danger is recognized in the above referenced US Patent Application 2006/0130654, which does describe use of a supersaturated desiccant solution, but where there is stated that "so long as the mixture is relatively clean, the LiCl will not precipitate out as the LiCl concentration moves beyond the equilibrium saturation point." While superasturation may increase the amount of moisture absorbed by a given mass of desiccant, and will enable the use of a lower circulating volume of desiccant, this lower volume will heat up more when absorbing a given amount of water, and therefore may mandate cooling in the absorber vessel, as is indeed performed in the above referenced prior art. However, in order to increase the reliability of the system by reducing the chance of clogging, and in order to simplify the desiccant cooling requirement, in the systems of the present disclosure, the concentration of the most moisture depleted desiccant, i.e. at the exit from the liquid-liquid heat exchanger 60, (state 6), is adapted to be approximately of the order of 2° C. away from supersaturation, such that the desiccant is exploited as much as possible, but that the concentration does not get too close to supersaturation. The cooling required in the presently described system, where the only heat exchange to cool the desiccant is heat exchanger 60 in the regeneration return line, state 6, is thus in contrast to prior art systems using supersaturated desiccant solutions, where additional heat extraction is required. The simplicity and high reliability of the present system therefore compensates for the lower rate of production of water per unit volume of desiccant.

Referring back now to the flash drum desorber 70, since the desiccant solution in the flash drum is at sub-atmospheric pressure, in order to return the desorbed desiccant to the absorber cycle, which is at atmospheric pressure, it is necessary to pass the liquid desiccant down a second barometric leg 90, such that it recovers from the low pressure within the flash drum and attains atmospheric pressure at the bottom end. In systems where the vacuum is such that approximately 8 to 10 m. height is required for such a barometric leg, and if this would involve a disadvantageous design, a pump could be used for this purpose.

Returning now to the flash drum 70, the pure water vapor (state 7) desorbed from the liquid desiccant in the flash drum now enters the condenser 80, since the vapor pressure of the desiccant solution is very high and it itself does not evaporate. A droplet barrier (not shown in FIG. 1) at the outlet of the desorber will prevent small desiccant droplets from getting to the condenser unit. The pressure in the condenser (the saturation pressure) is defined by the temperature of the condensing vapor. The latent heat of condensation is removed by a coolant flow (states 10 and 11) flowing through the condensation surfaces 82 within the vapor condenser 80. The current flow may conveniently be provided by a refrigerating cycle external to the LDS system, such as a conventional electrical refrigeration system. Depending on the ambient conditions, the condensation temperature range should be below 20° C., and preferably within the range between 4 and 15° C., this low temperature range resulting in a high level of water condensation.

Since the vapor condenser also has a sub-atmospheric pressure within it, typically up to 3 to 4 kPascal, a barometric leg 91 is also required for the path of the condensed water (state 8) from the condenser 82 to the water collection tank 83 (state 9). As previously a pump could be used for this purpose to raise the water pressure to atmospheric pressure. Although use of pumps instead of barometric legs involves increased parasitic energy use, the energy required is small since the flow rates are small, such that the parasitic energy required by such a pumping scheme is a small part of the total energy expenditure of the complete system.

As an alternative to locating the flash drum and condensers at a barometric height above the absorber tower, it is possible to locate them at the same level as the absorber tower and to use pumps overall to overcome the pressure differential between these two components, and the absorber tower which is at atmospheric pressure. However, this use of pumps increases the running cost of the system, and possible also the capital cost, both of which are important parameters for installations for use in isolated areas, especially in developing countries, even if the additional expense is small.

Because of the corrosivity of the liquid desiccants generally used, the system should be made of materials withstand the corrosive action, such as polymeric materials. The heat exchangers and condensers, which should provide efficient conductive heat transfer, may be made of a metal such as titanium, which withstands the chemical effects of the liquid desiccant.

Another important advantage of the present system over a direct cooling system is the quality of the produced water. The chemical and physical quality of the water produced by direct electrical cooling Atmospheric Moisture Harvesting (AMH) is satisfactory, with low turbidity, neutral to acidic pH and very low salinity. However, the microbial quality is of concern, since the condensate may be contaminated by airborne bacteria. Filtration and disinfection processes are therefore required for domestic AMH use, and bear additional energetic costs. In contrast, for an LDS-AMH system, the coil of the condenser does not get in contact with the ambient air but only with pure vapor that has been desorbed from the desiccant solution. While airborne particles may contaminate the desiccant solution, they are not volatile and will not be released from the solution in the desorber. Moreover, airborne bacteria will face an osmotic shock by the extremely concentrated desiccant solution, which will result in plasmolysis of any non-halophiles bacteria (the osmotic pressure of the LiCl solution in contact with the ambient air in the absorber is expected to be about 145 MPa). Solid particles and plasmolysis residues can easily be filtered out of the desiccant solution, saving the need to install a filter at the ambient air inlet, and the energy to overcome the pressure drop it causes.

Reference is now made to Table 1, which shows the performance of a model of an LDS-AMH system constructed according to the present disclosure, in comparison with the performance of commercially available direct cooling AMH systems. The heat interaction of the condenser in the model LDS-AMH system was compared to the heat interaction of an electrical direct-cooling AMH system that cools the entire bulk of air to 4° C. and produces freshwater at the same rate. For most of the investigated scenarios (i.e. ambient conditions), the heat interaction of the condenser is smaller by 10-13 kW for the LSD-AMH system than for the direct-cooling AMH systems shown in the table, and producing the same amount of water, which represents 40-90% saving. The actual electrical work demand of the system depends on the Coefficient of Performance (COP) of the cooling unit and on all the parasitic losses. Significant increase in the specific energy requirements is found when the system operates at ambient relative humidity <30%.

Since the LDS-AMH system is more complex than conventional AMH system and as parasitic losses estimation is difficult because they depend on the exact design of the system, the calculation the models was performed for two levels of expected parasitic losses, one at 1.25 kW, and another 50% higher, at 1.88 kW, in order to see the effect of the parasitic losses on the overall efficiency. Such differences in parasitic losses may typically arise from the use of pumps instead of barometric legs, which would increase parasitic losses, and the use of the liquid desiccant flow heat exchanger, whose achievement in increasing the heat utilization efficiency would decrease parasitic losses. As is expected, all of the presently described LDS-AMH models were substantially more efficient than those of commercially available AMH systems, even with a high estimated level of parasitic losses, resulting in significant energy savings.

TABLE 1

|  |  | Watergen GEN-350G | Watair CI-7500 | Watair CI-5000 | Watair AirJuicer 4010 | Skywater 300 |
|---|---|---|---|---|---|---|
|  |  | Commercially available AMH systems ||||| 
| Inlet air temperature | ° C. | 25 | 26.7 | 26.7 | 26.7 | 27.2 |
| Inlet air relative humidity | % | 55 | 60 | 60 | 60 | 47 |
| Energy requirement | kWh/l | 0.31 | 0.32 | 0.39 | 0.63 | 0.40 |
|  |  | Computed LDS-AMH system of present disclosure (1.25 kW parasitic losses) ||||| 
| Energy Requirement | kWh/l | 0.24 | 0.23 | 0.23 | 0.23 | 0.26 |
| Energy Saving | % | 21.8 | 29.7 | 42.3 | 64.3 | 35.7 |
|  |  | Computed LDS-AMH system of present disclosure (1.88 kW parasitic losses) ||||| 
| Energy Requirement | kWh/l | 0.29 | 0.27 | 0.27 | 0.27 | 0.31 |
| Energy Saving | % | 5.3 | 16.6 | 31.5 | 57.6 | 22.5 |

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. A method of extracting water from atmospheric air, comprising the steps of:
    charging liquid desiccant having a concentration below supersaturation, with water vapor from said atmospheric air in contact with said liquid desiccant flowing along a surface in an absorber vessel;
    desorbing said water vapor by heating said charged liquid desiccant in a flash drum desorbing vessel at a sub-atmospheric pressure;
    cooling said water vapor to a temperature below 20° C. such that water is condensed therefrom; and
    returning said heated desorbed liquid desiccant to said absorber vessel through a heat exchanger, in which at least part of its heat content is transferred to said charged liquid desiccant passing from said absorber vessel to said flash drum desorbing vessel.

2. The method according to claim 1, wherein said desorbing of said water vapor is performed on a part of said liquid desiccant charged with water vapor, such that the other part of said liquid desiccant can be recirculated through said absorber vessel to be further charged with water vapor in said absorber vessel.

3. The method according to claim 1, wherein said heating said charged liquid desiccant in said flash drum desorbing vessel at said sub-atmospheric pressure is performed using heat from a low grade or solar heat source.

4. The method according to claim 1, wherein said condensed water is collected from said vapor condenser through a barometric leg into a storage vessel.

5. The method according to claim 1, wherein said heated desorbed liquid desiccant from said flash drum desorbing vessel is returned to said absorber vessel through a barometric leg.

6. The method according to claim 1, wherein said sub-atmospheric pressure in said flash drum desorbing vessel is maintained by use of a vacuum pump.

7. The method according to claim 6, wherein said vacuum pump is connected to said flash drum desorbing vessel through said vapor condenser.

* * * * *